United States Patent
Cheong et al.

(10) Patent No.: US 10,931,954 B2
(45) Date of Patent: Feb. 23, 2021

(54) IMAGE CODING MODES SELECTION FOR AN EMBEDDED CODEC CIRCUITRY

(71) Applicant: SONY CORPORATION, Tokyo (JP)

(72) Inventors: Hye-Yeon Cheong, San Jose, CA (US); Ali Tabatabai, San Jose, CA (US)

(73) Assignee: SONY CORPORATION, Tokyo (JP)

(*) Notice: Subject to any disclaimer, the term of this patent is extended or adjusted under 35 U.S.C. 154(b) by 245 days.

(21) Appl. No.: 16/196,230

(22) Filed: Nov. 20, 2018

(65) Prior Publication Data
US 2020/0162742 A1 May 21, 2020

(51) Int. Cl.
*H04N 19/154* (2014.01)
*H04N 19/176* (2014.01)
*H04N 19/103* (2014.01)

(52) U.S. Cl.
CPC ......... *H04N 19/154* (2014.11); *H04N 19/103* (2014.11); *H04N 19/176* (2014.11)

(58) Field of Classification Search
CPC .. H04N 19/154; H04N 19/103; H04N 19/176; H04N 19/124; H04N 19/132; H04N 19/126; H04N 19/61; G06K 9/00
USPC ........................................................ 382/239
See application file for complete search history.

(56) References Cited

U.S. PATENT DOCUMENTS

| | | | | |
|---|---|---|---|---|
| 6,396,958 B1 * | 5/2002 | Wilson | ................... | H04N 19/60 375/E7.144 |
| 7,580,582 B2 | 8/2009 | Marcellin et al. | | |
| 8,780,996 B2 * | 7/2014 | Bankoski | ............... | H04N 19/14 375/240.24 |
| 9,374,577 B2 | 6/2016 | Wang et al. | | |
| 9,420,285 B2 | 8/2016 | Tu et al. | | |
| 9,432,675 B2 | 8/2016 | Lee et al. | | |
| 2005/0024487 A1 | 2/2005 | Chen | | |
| 2007/0150784 A1 | 6/2007 | Pan et al. | | |
| 2011/0317930 A1 * | 12/2011 | Kim | ....................... | H04N 19/52 382/233 |
| 2012/0183051 A1 * | 7/2012 | Zhang | ................... | H04N 19/147 375/240.03 |
| 2012/0269274 A1 * | 10/2012 | Kim | ..................... | H04N 19/179 375/240.24 |

(Continued)

OTHER PUBLICATIONS

Hwang, et al., "Efficient Intra Mode Selection using Image Structure Tensor for H.264/AVC", Image Processing, 2007 IEEE International Conference, Sep. 16-Oct. 19, 2007, pp. V-289-V-292.

(Continued)

*Primary Examiner* — Ali Bayat
(74) *Attorney, Agent, or Firm* — Chip Law Group

(57) ABSTRACT

A media device includes a processor to calculate a value of an objective function for each sequence of modes of a plurality of sequences of modes, based on at least statistical data of a plurality of modes. The plurality of sequences of modes corresponds to different combinations of modes from the plurality of modes. The plurality of modes corresponds to a plurality of encoding operations executed. The processor selects a sequence of modes from the plurality of sequences of modes based on a value of the objective function associated with the sequence of modes. The modes in the selected sequence of modes are less than the plurality of modes and represents an optimal encoding scheme executable to encode an input image block.

20 Claims, 7 Drawing Sheets

(56) References Cited

U.S. PATENT DOCUMENTS

| | | | |
|---|---|---|---|
| 2016/0029027 A1* | 1/2016 | Katamaneni | H04N 19/65 375/240.02 |
| 2017/0019674 A1 | 1/2017 | Nakagami et al. | |
| 2017/0070752 A1* | 3/2017 | Kalevo | H04N 19/12 |
| 2020/0296422 A1* | 9/2020 | Zhu | H04N 19/122 |

OTHER PUBLICATIONS

Suryavanshi et al., "Error-Resilient Packet Header Compression", IEEE Transactions on Communications, vol. 56, No. 11, Nov. 2008, pp. 1836-1843.

Agueh et al., "Optimal JPWL Forward Error Correction Rate Allocation for Robust JPEG 2000 Images and Video Streaming Over Mobile Ad Hoc Networks", EURASIP Journal and Advance in Signal Processing, vol. 2008, Article ID 192984, 13 pages, 2008.

* cited by examiner

IMAGE CODING MODES SELECTION FOR AN EMBEDDED CODEC CIRCUITRY

CROSS-REFERENCE TO RELATED APPLICATIONS/INCORPORATION BY REFERENCE

None.

FIELD

Various embodiments of the disclosure relate to image and video compression or decompression technologies. More specifically, various embodiments of the disclosure relate to selection of image coding modes for an embedded codec (EBC) circuitry.

BACKGROUND

With recent advancements in imaging technologies for image compression, there is an increasing demand for on-chip codecs in image capturing and display devices that can handle compression and storage of different images or video in wide variety of image resolutions (e.g., low to high resolution images/video). Currently, based on different application specific requirements, such as compression ratio requirement, random access requirement, latency requirement, or input image data characteristics, the compression technique may change or a number of operations applied to compress the image may vary from requirement to requirement. Typically, each time the user specifies a different requirement, a different image compression technique may be required. In certain scenarios, the input image data may be first encoded with a particular compression technique and then decoded to measure the coding performance of the used compression technique. In such scenarios, performing encoding and decoding operations for each possible compression technique may lead to compression inefficiency and sub-optimal memory usage, especially in on-chip codes where it is desirable to achieve an area efficiency with respect to throughput while minimizing an on-chip memory usage.

Further limitations and disadvantages of conventional and traditional approaches will become apparent to one skill in the art, through comparison of described systems with some aspects of the present disclosure, as set forth in the remainder of the present application and with reference to the drawings.

SUMMARY

A media device and a method for selection of image coding modes for embedded codec (EBC) circuitry are provided, substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various embodiments of the present disclosure may be found in a method and a media device for selection of image coding modes for an embedded codec (EBC) circuitry. The media device may include a memory and circuitry processor that handles selection of image coding modes for the EBC circuitry. The disclosed EBC circuitry is capable of performing a plurality of encoding operations on an image block (one dimensional (1D) image block or 2D image block). In order to encode the image block, a combination of encoding operations, which defines a sequential encoding scheme, may be applied on the image block. The combination of encoding operations may vary for different requirements of compression ratio, random access, block size, or input image characteristics. The disclosed processor measures a coding performance of all the possible combinations of the encoding operations, without actually performing the encoding operations as well as decoding operations in real time. The coding performance is measured based on statistical data of the encoding operations. An optimal combination of encoding operations is selected from all the possible combinations of the encoding operations, which maximizes the coding performance with respect to one more output requirements. The application of the optimal combination of encoding operations on the image block ensures that the desired output requirement is achieved in minimum number of encoding operations, or the processing overheads are reduced. As a result of such application of optimal combination of encoding operations, compression efficiency is significantly improved without an adverse impact on quality of encoded image. Further, an area efficiency with respect to throughput of the disclosed EBC circuitry is enhanced and an on-chip memory usage is optimized.

There may be different encoding requirements, such as compression ratio, random access, block size, or input image characteristics, for different application (or use case) scenarios, In such application scenarios, the image/video data to be processed for encoding purposes may be different. Currently, such different application scenarios require different embedded codec (EBC) design/operational capability based on the type of test image/video data. Further, hardware constraints, such as gate size and latency requirement, also needs to be selected in congruence with the provided application request and/or test data. The disclosed media device provides an automated solution for selection of coding modes for the EBC design, based on specified application requirements.

Figure 1:
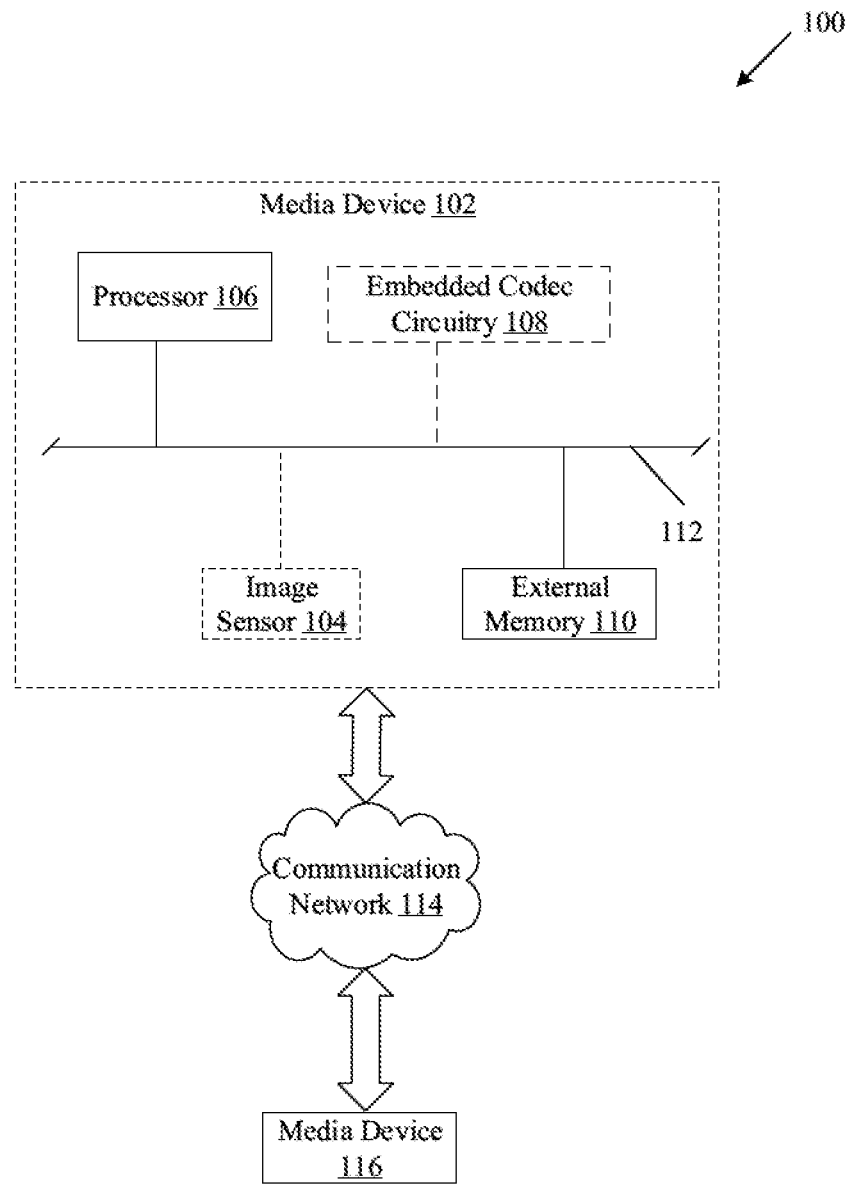
FIG. 1 is a block diagram that illustrates an exemplary media device with various peripheral components for selection of image coding modes for an embedded codec (EBC) circuitry, in accordance with an embodiment of the disclosure.

FIG. 1 is a block diagram that illustrates an exemplary media device with various peripheral components for selection of image coding modes for an embedded codec (EBC) circuitry, in accordance with an embodiment of the disclosure. With reference to FIG. 1, there is shown a media device 102 that includes a processor 106 and an external memory 110, a communication network 114, and a media device 116. In some embodiments, an image sensor 104 and an embedded codec (EBC) circuitry 108 may be communicatively coupled to the processor 106 and the external memory 110. In other embodiments, the media device may include the EBC circuitry 108 along with the processor 106 and the external memory 110. There is further shown a system bus 112 that interconnects the image sensor 104, the processor 106, the EBC circuitry 108, and the external memory 110.

The media device 102 may comprise suitable logic, circuitry, and interfaces that may be configured to store a plurality of image coding modes corresponding to different encoding operations in the external memory 110. The media device 102 may be further configured to receive application specific requirements based on a user input and further, select an optimal combination of image coding modes based on the specified application requirements. The media device 102 may include a dedicated on-chip codec (such as the EBC circuitry 108) for an offline (without the need for Internet/network) processing and compression/decompression of images/video. In some embodiments, the media device 102 may also include the EBC circuitry 108 and one or more image sensors (such as the image sensor 104) to capture images in a raw image file format, which is an uncompressed file format. In such cases, the captured image may be encoded by the EBC circuitry 108 of the media device 102. Examples of the media device 102 may include, but are not limited to, a digital camera, a portable communication device (e.g. laptops, smartphones, tablets, phablets, smart watches, smart glasses, etc.), a media server, a workstation, a desktop computer, and augmented reality/Virtual Reality/Mixed Reality (AR/VR/MR) devices.

The image sensor 104 may comprise suitable logic, circuitry, and interfaces that may be configured to capture a raw uncompressed image or a sequence of raw uncompressed images of a scene in a field-of-view (FOV) of the image sensor 104. The image sensor 104 may be implemented as an active pixel sensor, such as a complementary-metal-oxide semiconductor (CMOS) sensor. In such implementation, the image sensor 104 may be configured to execute progressive scan (line-by-line) of each row or column of pixels (1D pixel-array or 2D pixel array) on a sensor core of the CMOS sensor. The progressive scan may be a vertical scan (column wise) or a horizontal scan (row wise). In some embodiments, instead of an active pixel sensor, the image sensor 104 may be implemented as one of a passive pixel sensor (such as a charged coupled device (CCD) sensor, an oversampled binary image sensor, a planar Fourier capture array (PFCA), a back-illuminated (BSI or BI) sensor, and the like. Although not shown, the image sensor 104 may also include a specialized microprocessor (or a microcontroller) that is configured to operate in accordance with image data from the image sensor 104, a graphic processing unit (GPU) to process images stored in a frame buffer, and/or a memory integrated with the image sensor 104.

The processor 106 may comprise suitable logic, circuitry, and interfaces that may be configured to execute a set of instructions stored in a dedicated memory (e.g., the external memory 110 or an on-chip memory in the EBC circuitry 108). The processor 106 may be implemented based on a number of processor technologies known in the art. Examples of the processor 106 may include, but are not limited to, a Graphical Processing Unit (GPU), a co-processor (such as a specialized image co-processor) for a processor, a specialized digital signal processor, a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor.

The EBC circuitry 108 may comprise suitable logic, circuitry, and interfaces that may be configured to encode an image block (e.g., a 16×1 image block or a 2D image block) as per a specific compression factor. The EBC circuitry 108 may be further configured to decode the encoded image block, in response to instructions received at the EBC circuitry 108. In some embodiments, the image block may be part of an input image (i.e. a raw uncompressed image) or a pixel array (row or column) retrieved directly from a read out register of the image sensor 104, following a row-wise or a column-wise scan by the image sensor 104. The EBC circuitry 108 may further manage storage of a bit-stream of encoded image block in the external memory 110 or may manage transfer of the bit-stream of encoded image to other media devices via dedicated communication networks.

The EBC circuitry 108 may be implemented as a specialized hardware encoder/decoder that may interface with the other computational circuitries of the media device 102. In such implementation, the EBC circuitry 108 may be associated with a specific form factor on a specific computational circuitry. Examples of the specific computational circuitry may include, but are not limited to, a field programmable gate array (FPGA), programmable logic devices (PLDs), an application specific integrated circuit (ASIC), a programmable ASIC (PL-ASIC), application specific integrated parts (ASSPs), and a System-on-Chip (SOC) based on standard microprocessors (MPUs) or digital signal processors (DSPs). In accordance with another embodiment, the EBC circuitry 108 may be also interfaced with a graphical processing unit (GPU) to parallelize operations of the EBC circuitry 108. In accordance with yet another embodiment, the EBC circuitry 108 may be implemented as a combination of programmable instructions stored in a memory and logical units (or programmable logic units) on a hardware circuitry of the media device 102.

The external memory 110 may comprise suitable logic, circuitry, and interfaces that may be configured to store an input image (uncompressed raw or encoded) or a sequence of input images. The external memory 110 may be further configured to act as an image buffer to store raw uncompressed image blocks retrieved directly from the image sensor 104. Additionally, the external memory 110 may store instructions associated with encoding operations that may be applied, by the EBC circuitry 108, to generate a bit-stream of encoded image block. The encoding operations may include, but is not limited to, pre-processing, data partitioning, transform coding, quantization scheme, prediction scheme, and entropy coding scheme. In an exemplary embodiment, the external memory 110 may be a persistent storage memory or a dynamic random access memory (DRAM) that may be externally interfaced with the EBC circuitry 108. In another exemplary embodiment, the external memory 110 may be static random access memory (SRAM) circuits that may be externally interfaced with the EBC circuitry 108. Further examples of implementation of the external memory 110 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

In some embodiments, the EBC circuitry 108 may also provide support (e.g., a backward compatibility) for different codec standards that may include Advanced Video Codec (AVC)/Media Experts Group (MPEG-4/AVC) or H.264, MPEG-4/HEVC or H.265, and the like. Additionally, the video codec may be supported by other codec libraries that may include FFmpeg, Xvid, DIVx, VP1-9, Windows Media Codec, FFays, and the like.

The system bus 112 may be a hardware bus that may include a set of data channels (or conductive paths) to different components of the media device 102. Alternatively stated, the system bus 112 may interconnect at least data ports, address ports, and control signal ports of different components of the media device 102. For example, the system bus 112 may interconnect the image sensor 104, the processor 106, the EBC circuitry 108, the external memory 110, and other circuitries to each other. The system bus 112 may be configured to facilitate a serial data communication or parallelized data communication between different components on-board the media device 102. Examples of the system bus 112 may include an 8-bit parallel single system bus, a 16-bit parallel single system bus, a 32-bit parallel single system bus, a 64-bit parallel single system bus, a serial data bus, and the like.

The communication network 114 may include a medium through which the media device 102 may communicate with the media device 116. Examples of the communication network 110 may include, but are not limited to, the Internet, a cloud network, a Long Term Evolution (LTE) network, a Wireless Local Area Network (WLAN), a Local Area Network (LAN), a telephone line (POTS), and/or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

The media device 116 may comprise suitable logic, circuitry, and interfaces that may be configured to store uncompressed raw images and/or videos as encoded (i.e. compressed) images and/or videos in the external memory 110. The media device 116 may be further configured to manage encoding as well as decoding of media content (for example, encoded images and/or videos) and further playback of the decoded media content at the media device 116. The media device 116 may include a dedicated on-chip codec (such as the EBC circuitry 108) for an offline (without the need for Internet/network) processing and compression/decompression of images/video. In some embodiments, the media device 116 may also include one or more image sensors (such as the image sensor 104) to capture images in a raw image file format, which is an uncompressed file format. In such cases, the captured image may be encoded by the EBC circuitry 108 of the media device 116. Examples of the media device 116 may include, but are not limited to, a digital camera, a portable communication device (e.g. laptops, smartphones, tablets, phablets, smart watches, smart glasses, etc.), a media server, a workstation, a desktop computer, and augmented reality/Virtual Reality/Mixed Reality (AR/VR/MR) devices.

In operation, the processor 106 may receive an input from a user, which specifies an output requirement from the different types of requirements. The different types of requirements may include, but are not limited to, compression ratio requirement, random access requirement, block size requirement, and input data characteristics. The input data characteristics may define the type of input image data that is to be processed. The input data characteristics may include, but are not limited to, different input type such as raw Bayer image, YUV444, YUV422, YUV420, RGB, RGBD, Area AD, Pixel AD, etc, Standard dynamic range (SDR), High dynamic range (HDR), single-view, multi-view, natural image data, synthetic image data, sensor data, depth data, etc.

The processor 106 may be configured to calculate a value of an objective function for each combination of image coding modes of a plurality of combinations of image coding modes. Each combination of modes may be a defined sequence of image coding modes, where encoding operations are executed one after another in a defined sequence. For example, a combination of image coding modes may include a first mode (corresponding to a data partitioning scheme), a second mode (corresponding to a quantization scheme), and a third mode (corresponding to an entropy coding scheme) in the defined sequence i.e., the first mode->the second mode->the third mode. More specifically, the encoding operations, represented by this combination may be executed, in the defined sequence. Alternately stated, the processor 106 may be configured to calculate a value of the objective function for each sequence of image coding modes of a plurality of sequences of image coding modes. The objective function may be a quality measure to evaluate the coding performance of the EBC circuitry 108, while executing a sequence of encoding operations. The value of the objective function may be calculated based on statistical data of the plurality of image coding modes. The statistical data may include, but is not limited to, a number of bits required to encode the image block corresponding to each image coding mode of the plurality of image coding modes. In some embodiments, the statistical data may also include a quantization parameter corresponding to each image coding mode of the plurality of image coding modes. The statistical data for each image coding mode of the plurality of image coding modes may be stored in a memory, such as the external memory 110 (e.g., a dedicated SRAM, DRAM, or an on-chip cache) in the media device 102.

The processor 106 may be further configured to select an optimal combination of image coding modes from the plurality of combinations, which maximizes the coding performance. The objective function value for the optimal combination of image coding modes may be maximum among the plurality of combinations of image coding modes. The optimal combination of image coding modes may correspond to a minimum number of encoding operations to be applied on the image block to achieve the maximum coding performance.

The processor 106 may be further configured to generate header information for the optimal combination of image coding modes. The header information may include a set of signaling bits corresponding to each image coding mode in the optimal combination of image coding modes. The header information may be utilized to determine an encoding scheme for the EBC circuitry 108 to entropy code the image block.

For encoding of the image block at the media device 116, the image block may be received by the external memory 110 of the media device 116. In some embodiments, the image block may be retrieved directly from a read-out register of an on-chip image sensor (such as the image sensor 104) or a camera device that may interface with the media device 116. In other embodiments, the image block may be retrieved from an uncompressed raw input image stored in a persistent storage, such as the external memory 110, of the media device 116 or received externally from other media storage devices, such as cameras, data servers, etc.

The EBC circuitry 108 may be configured to receive the image block from the external memory 110 or directly from the read out register of the image sensor 104. The EBC circuitry 108 may be configured to execute a plurality of encoding operations. The plurality of encoding operations corresponds to a plurality of image coding modes of the EBC circuitry 108. The plurality of image coding modes may include, but are not limited to, modes corresponding to different pre-processing schemes, data partitioning schemes, transform coding schemes, quantization schemes, prediction schemes, and entropy coding schemes.

The EBC circuitry 108 may be further configured to generate a bit-stream of encoded image block by application of a set of encoding operations of the plurality of encoding operations, on the image block. The set of encoding operations may include encoding operations represented by the optimal combination of image coding modes.

In accordance with an embodiment, the EBC circuitry 108 may be configured to generate the bit-stream of encoded image block such that the bit-stream may be decodable by different external decoders that may utilize different decoding schemes to decode the bit-stream of encoded image block. In such a case, the EBC circuitry 108 may be configured to add different coding tables (e.g., custom coding tables for Huffman encoding schemes, Exponential-Golomb encoding schemes, or signaling bit tables) and quantization tables, in the header information or a different meta-stream associated with the bit-stream of encoded image block. By addition of such custom tables and quantization tables in the bit-stream, the output of the EBC circuitry 108 may be decodable by other decoder circuitries.

In accordance with an embodiment, the bit-stream of encoded image block may be stored as part of an input image (such as a 2D image), a complete image, or a video portion, in the memory, such as the external memory 110 or an on-chip memory in the EBC circuitry 108. In one implementation, the processor 106 may be configured to transfer the bit-stream of encoded image block, via the system bus 112, to a frame buffer (or a frame store) of a display circuitry (e.g., a video card) communicatively interfaced with the system bus 112 of the media device 102. The frame buffer may act as a compressed frame buffer for the display circuitry. The display circuitry (not shown in FIG. 1) may decode and further utilize the bit-stream of encoded bit-stream of image block to display a patch of image at the media device 102. In another implementation, the processor 106 may be configured to transfer the bit-stream of encoded image block, via the system bus 112, to a decoder buffer, such as a decoder picture buffer (DPB) of a video decoder, a buffer memory for an image decoder, or a coded picture buffer (CPB) of a video codec, in the media device 102.

In accordance with another embodiment, the EBC circuitry 108 may be configured to select the optimal combination of image coding modes based on the calculation of the objective function value, as a pre-processing step before the actual encoding operation. The EBC circuitry 108 may be further configured to generate the set of signaling bits corresponding to the optimal combination of image coding modes. The set of signaling bits may represent a set of encoding operations corresponding to the optimal combination of image coding modes. The EBC circuitry 108 may be further configured to encode the image block by application of the set of encoding operations to generate the encoded bit-stream.

In an exemplary implementation, the media device 102 may be a computer, such as a laptop or desktop computer that selects an optimal combination of image coding modes from a plurality of image coding modes for an embedded codec (EBC) circuitry, based on specified application requirements. In one example, the optimal combination of image coding modes (for example, 2 or 3 image coding modes) may be selected from a very large set of image coding modes (for example, 50, 100 or 1000, or N number of image coding modes). This process of image coding modes selection may be executed once for each EBC design, which may be dependent on an encoding scheme to be implemented inside the EBC. For example, a user may specify that an EBC is to be designed for a surveillance camera product, for which test image/video data may be acquired along with other requirements (such as compression ratio, random access requirement, etc). The media device 102 may select the optimal combination of image coding modes for such EBC design. Then, the EBC for the surveillance camera product may be designed, which implements the selected optimal combination of modes. In other words, for one type of application, the process of image coding modes selection, may be executed only once. The optimal combination of modes may be utilized to determine an encoding scheme to be implemented in the EBC to fulfill the specified application requirements.

In other implementation, the EBC circuitry 108 may be implemented inside the media device 102, such as a camera. In such scenario, the EBC circuitry 108 may select the optimal combination of image coding modes in a pre-processing step before the actual encoding operation. After selection of the optimal combination of image coding modes, the EBC circuitry 108 may encode the image block by application of an encoding scheme that corresponds to the optimal combination of image coding modes.

Figure 2:
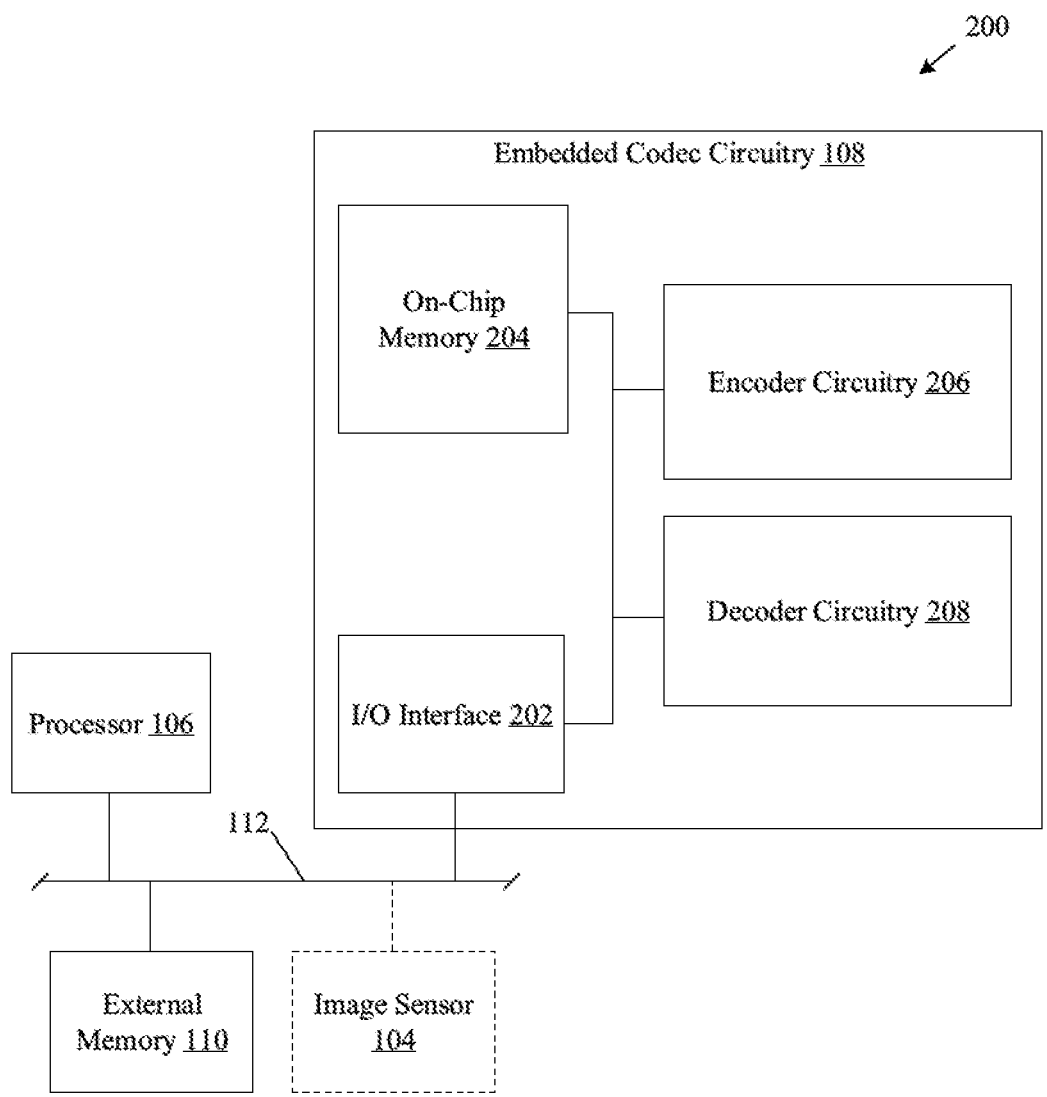
FIG. 2 is a block diagram that illustrates the EBC circuitry of FIG. 1 with various peripheral components for selection of image coding modes, in accordance with an embodiment of the disclosure.

FIG. 2 is a block diagram that illustrates an embedded codec (EBC) circuitry with various peripheral components for selection of image coding modes, in accordance with an embodiment of the disclosure. FIG. 2 is explained in conjunction with elements from FIG. 1. With reference to FIG. 2, there is shown a block diagram 200 of the EBC circuitry 108. The EBC circuitry 108 may include an Input/output (I/O) interface 202, an on-chip memory 204, an encoder circuitry 206, and a decoder circuitry 208. In the block diagram 200, there is also shown the image sensor 104, the processor 106, and the external memory 110 communicatively coupled to the EBC circuitry 108, via the system bus 112. In some embodiments, the processor 106 and the external memory 110 may be implemented inside the EBC circuitry 108, without a deviation from the scope of the disclosure.

The I/O interface 202 may comprise suitable logic, circuitry, and interfaces that may be configured to manage a plurality of I/O ports to facilitate exchange of communication data from other peripheral circuitries, via the system bus 112, for example, the external memory 110, the processor 106, or the image sensor 104. The communication data may include a bit-stream of the encoded image block, control signals, CPU instructions, and the like. The configuration of the I/O ports may depend on a specification of the EBC circuitry 108, for example, physical I/O pins in an ASIC, FPGA or a SoC chip.

The on-chip memory 204 may comprise suitable logic, circuitry, and interfaces that may be configured to store different operational data (e.g., transform domain data, residual levels, quantization levels, entropy coded bits, etc.) that may be utilized by different components of the EBC circuitry 108 to encode the image block. Examples of the operational data stored in the on-chip memory 204 may include, but are not limited to, a bit-stream of encoded image block, transform-domain data, quantized levels, quantized-transformed levels, quantized prediction residual levels, computed variables, and temporary processing data, and 1D/2D image blocks. The on-chip memory 204 may be implemented as a specific memory designed with a defined memory specification, such as a read/write speed, a memory size, fabrication factors, and the like. Examples of the on-chip memory 204 may include, but are not limited to, static random access memory (SRAM), dynamic access memory (DRAM), and Synchronous Dynamic RAM (SDRAM).

The encoder circuitry 206 may comprise suitable logic, circuitry, and interfaces that may be configured to generate a bit-stream of encoded image block by application of a set of encoding operations on an image block. In some embodiments, the encoder circuitry 206 may select an optimal combination of image coding modes from a plurality of combinations of image coding modes based on a value of an objective function. The plurality of combinations of image coding modes may be a plurality sequences of image coding modes. The encoder circuitry 206 may select the objective function based on different requirements such as compression ratio specified by a user. In some embodiments, the encoder circuitry 206 may be a hardware encoder chip that may be implemented based on one of ASIC, programmable logic devices (PLDs), SOC, FPGA, digital signal processors (DSPs) or other specialized circuitries. In other embodiments, the encoder circuitry 206 may be implemented as a combination of hardware and stored set of instructions in the on-chip memory 204 (for example, instructions based on VHDL or HDL logic).

The decoder circuitry 208 may comprise suitable logic, circuitry, and interfaces that may be configured to decode a bit-stream of encoded image block based on header information that includes a set of signaling bits allocated to the encoded image block. In some embodiments, the decoder circuitry 208 may have pre-stored coding tables that may act as a reference for the decoder circuitry 208 to decode the bit-stream of encoded image block based on the header information. In some embodiments, the decoder circuitry 208 may be a hardware encoder chip that may be implemented based on one of ASIC, programmable logic devices (PLDs), SOC, FPGA, digital signal processors (DSPs) or other specialized circuitries. In other embodiments, the decoder circuitry 208 may be implemented as a combination of hardware and stored set of instructions in the on-chip memory 204 (for example, instructions based on VHDL or HDL logic).

In operation, a plurality of image coding modes may be stored in the memory, such as the external memory 110 or the on-chip memory 204. The plurality of image coding modes may represent the different types of encoding operations that may be executed by the encoder circuitry 206. For example, 8 image coding modes $IM_1$, $IM_2$, ..., $IM_8$ may be stored, which correspond to a pre-processing scheme ($IM_1$), a data-partitioning scheme ($IM_2$), a transform coding scheme ($IM_3$), a first prediction scheme ($IM_4$), a second prediction scheme ($IM_5$), a quantization scheme ($IM_6$), a first entropy coding scheme ($IM_7$), and a second entropy coding scheme ($IM_8$). The different prediction schemes (first and second) and different entropy coding schemes (first and second) may be considered as separate image coding modes.

The processor 106 may be configured to determine an objective function that may represent a measure of coding performance of the encoder circuitry 206. The objective function may be determined based on the different application specific requirements specified based on user input. The application specific requirements may include input data characteristics, latency requirement, random access requirement, and compression ratio requirement. For example, the objective function may be determined as the sum of average peak signal to noise ratio (PSNR) and worst PSNR based on image block level random access and a fixed bitrate per image block. It should be noted that if the variable bitrate is required per image block, the objective function may also include a bit-rate term along with the quality term (PSNR).

In order to identify a set of encoding operations to be applied on the image block, the processor 106 may be configured to calculate a value of the determined objective function for each combination of image coding modes of the plurality of combinations of modes, based on statistical data of the plurality of image coding modes. The statistical data may include, but is not limited to, a number of entropy coded bits required to encode using a particular image coding mode of the plurality of image coding modes. The processor 106 may be further configured to collect the statistical data based on the objective function.

The processor 106 may be configured to select an optimal combination of image coding modes from the plurality of combinations of modes based on the calculated objective function value which is maximum among other combinations of image coding modes. The count of modes in the optimal combination of image coding modes may be less than a total count of modes in the plurality of image coding modes. For example, the encoder circuitry 206 may select the optimal combination of image coding modes from two combinations of image coding modes $C_1$ and $C_2$. "$C_1$" may include "$IM_3$, $IM_5$, and $IM_8$", and "$C_2$" may include "$IM_2$, $IM_6$, and $IM_7$." Then, the objective function value is calculated for both "$C_1$" and "$C_2$" and the combination "$C_2$", for which the objective function value is maximum, is selected as the optimal combination of image coding modes. The optimal combination of image coding modes may represent a set of encoding operations to be applied on the image block.

In accordance with an embodiment, the processor 106 may be further configured to generate a set signaling bits corresponding to each image coding mode in the optimal combination of image coding modes. The number of bits in the set of signaling bits may not be fixed for each image coding mode in the optimal combination. For example, for $C_2$, the set of signaling bits may contain $S_0=01$ (for $IM_2$), $S_1=00$ (for $IM_6$), and $S_2=1$ (for $IM_7$). If a fixed length coding scheme would have been used then the total number of bits required to signal the image coding modes would be 6 bits (2 bits for each mode). In this example, only 5 bits are required, which provides a savings of 1 bit. Thus, the variable assignment of the signaling bits may ensure the minimum number of bits are required to indicate the optimal combination of image coding modes.

The processor 106 may be further configured to communicate the set of signaling bits, to the EBC circuitry 108. The set of signaling bits may specify a sequential coding scheme to be implemented in the encoder circuitry 206. The encoder circuitry 206 may be further configured to generate a bitstream of the encoded image block by application of the sequential coding scheme on the image block. The sequential coding scheme includes the encoding operations that corresponds to the image coding modes present in the optimal combination. For example, the image block may be encoded by application of encoding operations corresponding to $IM_2$, $IM_6$, and $IM_7$. More specifically, the sequential encoding scheme may include execution of the data portioning scheme ($IM_2$), followed by the quantization scheme ($IM_6$), and the first entropy coding scheme ($IM_7$). The selection of the optimal combination of image coding modes may ensure that maximum coding performance is achieved with minimum number of encoding operations. A number of bits in the bit-stream of encoded image block may also include the set of signaling bits, in addition to the encoded bits for the image block. The variable length of the set of signaling bits may further ensure that the minimum number of bits are used to indicate the sequential encoding scheme applied on the image block.

In certain embodiments, the encoder circuitry 206 may be configured to execute the operations similar to the operations executed by the processor 106 to select the optimal combination of image coding modes. The encoder circuitry 206 may be configured to select the optimal combination of image coding modes as a pre-processing step prior to actual encoding operation.

Figure 3:
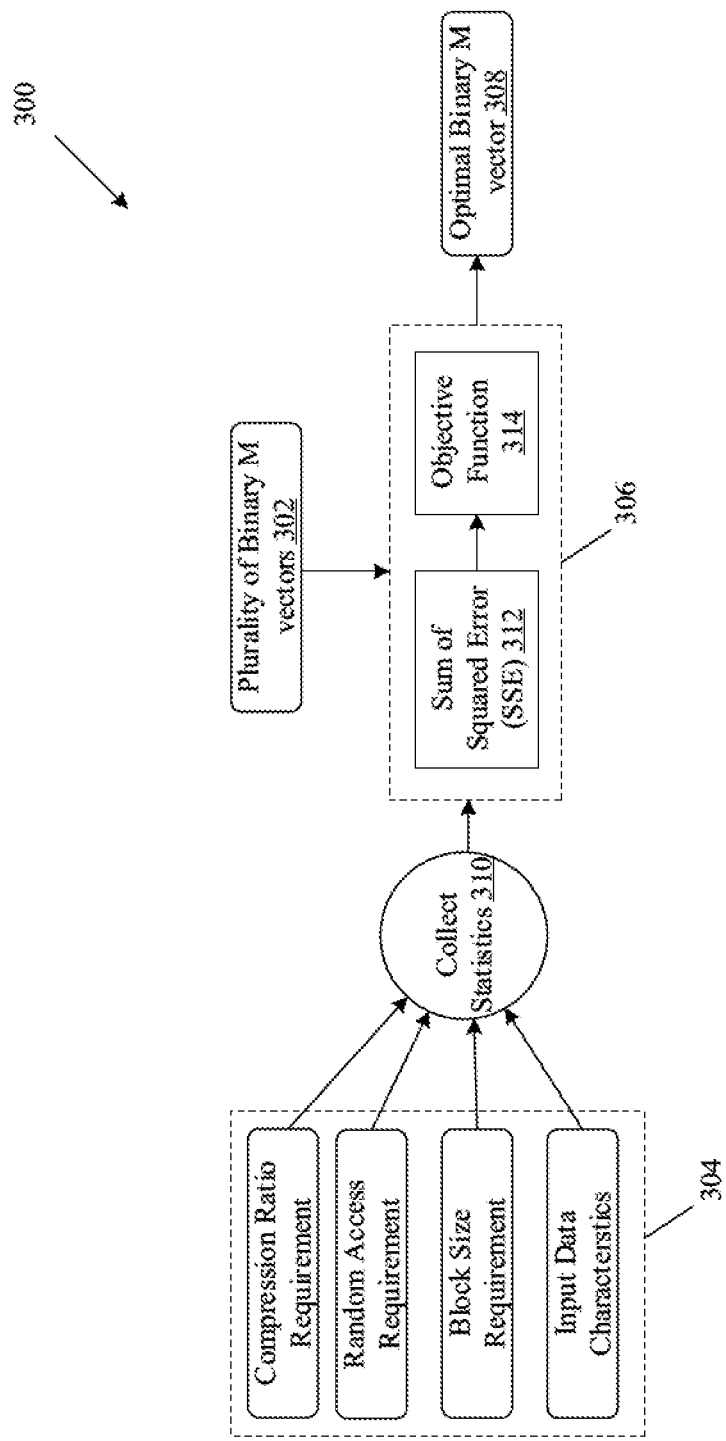
FIG. 3 illustrates for selection of an optimal combination of various image coding modes by the media device of FIG. 1, in accordance with an embodiment of the disclosure.

FIG. 3 illustrates selection of an optimal combination of various image coding modes by the media device of FIG. 1, in accordance with an embodiment of the disclosure. FIG. 3 is explained in conjunction with elements from FIG. 1 and FIG. 2. With reference to FIG. 3, there is shown a block diagram 300. The block diagram 300 may describe determination of an optimal combination of image coding modes from a given plurality of binary M vectors 302. As shown, there is a requirement block 304 that contains the different types of requirements specified by a user, and an optimization block 306 that outputs an optimal binary M vector 308.

The requirement block 304 may include the different types of requirements. The processor 106 may receive an input from a user, which specifies an output requirement from the different types of requirements. The different types of requirements may include, but are not limited to, compression ratio requirement, random access requirement, block size requirement, and input data characteristics. The input data characteristics may define the type of input image data that is to be processed. The input data characteristics may include, but are not limited to, different input type such as raw Bayer image, YUV444, YUV422, YUV420, RGB, RGBD, Area AD, Pixel AD, etc, Standard dynamic range (SDR), High dynamic range (HDR), single-view, multi-view, natural image data, synthetic image data, sensor data, depth data, etc. As shown in FIG. 3 in an example, the different types of requirements may be fed into a collect statistics block 310, where the processor 106 may collect statistical data for each image coding mode of the plurality of image coding modes based on the requirements specified by the user. For collecting the statistical data, the processor 106 may enable all the available image coding modes and determine a number of entropy coded bits and quantization parameter for each image coding mode of the plurality of image coding modes. The collected statistical data is then transferred to the optimization block 306. In an exemplary embodiment, the processor 106 may store the statistical data in the external memory 110, and then the processor 106 may extract the statistical data from the external memory 110.

In the optimization block 306, the processor 106 may receive the plurality of binary M vectors 302. The plurality of binary M vectors 302 may represent different combinations of image coding modes. Each combination may be a sequence of image coding modes. The size of the plurality of binary M vectors 302 may be equal to the total number of image coding modes, where '1' may indicate that the corresponding image coding mode is enabled. For example, a binary vector M equal to [0 1 0 0 1 1] may indicate that image coding modes corresponding to second, fifth, and sixth bit-position are enabled. As shown in FIG. 3 in an example, the optimization block 306 may include a sum of squared error block 312 and an objective function block 314.

In the sum of squared error block 312, the processor 106 may calculate a sum of squared error (SSE) for each binary M vector of the plurality of binary M vectors 302, based on the received statistical data. In the objective function block 314, the processor 106 may determine an objective function value for each binary M vector of the plurality of binary M vectors 302, based on the SSE. In an exemplary embodiment, equation may represent the objective function 1 as follows:

$$\text{Objective Function }(F)=\text{PSNR}+w^*\text{WPSNR} \quad (1)$$

where PSNR may represent the peak signal to noise ratio of the image block, w represents the weight of the image block, and WPSNR may represent the average PSNR of the worst image blocks. The processor 106 may determine the objective function as represented by the equation 1, based on the block level random access and a fixed bit-rate per image block. It should be noted that the objective function may change based on the type of requirement. For example, if the bit-rate is variable, then the objective function may also include a bit-rate term along with the quality term (PSNR and WPSNR).

In the optimization block 306, the processor 106 may select the optimal binary M vector 308 that has the maximum objective function value among all other binary M vectors. The maximum objective function value may specify that the maximum coding performance can be achieved by encoding the image block with the image coding modes (i.e., a particular sequence of coding modes) indicated by the optimal binary M vector 308. It has been observed that the coding performance saturates after a particular number of image coding modes, which is actually the optimal number of image coding modes. For example, the processor 106 may support 25 image coding modes, and the coding performance (Average PSNR) linearly increases with increase in number of image coding modes up to a particular number of modes (e.g. '4'). The number of image coding modes may represent the complexity of the encoding system. It is observed that increasing the number of image coding modes beyond '4' does not improves the average PSNR, as the average PSNR remain approximately equal for the number of image coding modes greater than '4'. Therefore, encoding the image block with 4 modes will give the same effect as encoding with 25 modes, which shows that an optimal combination of modes can be determined so that the maximum performance is achieved with minimal complexity. The optimal binary vector 308 may represent the optimal combination of image coding modes (or a set of encoding operations). The encoder circuitry 206 may encode the image block by application of the set of encoding operations represented by the optimal binary vector 308.

Figure 4A:
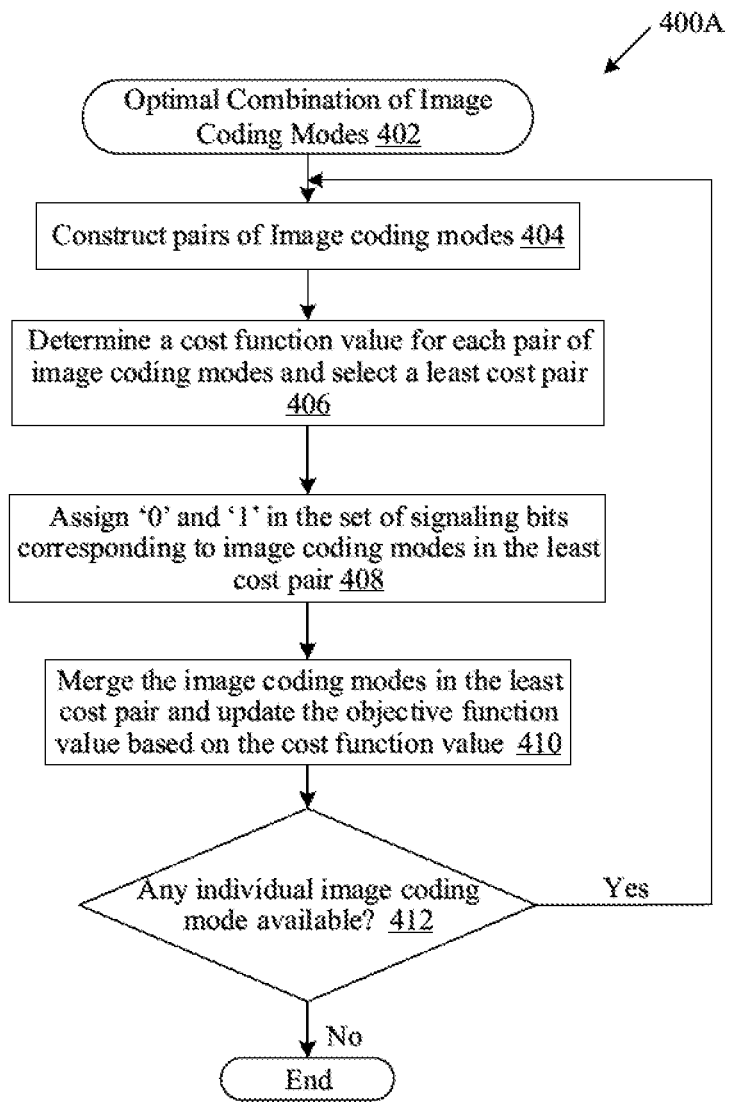
FIG. 4A illustrates operations to generate a set of signaling bits used by the media device of FIG. 1, in accordance with an embodiment of the disclosure.

FIG. 4A illustrates operations to generate a set of signaling bits used by the media device of FIG. 1, in accordance with an embodiment of the disclosure. FIG. 4A is explained in conjunction with elements from FIGS. 1, 2, and 3. With reference to FIG. 4A, there is shown a flow chart 400A implemented in the EBC circuitry 108. The method starts at 402, where the optimal binary M vector 308 is received. The optimal binary M vector represents the optimal combination of image coding modes. Then, the method proceeds to 404.

At 404, a plurality of pairs of image coding modes may be constructed. The processor 106 may be configured to construct all possible pairs of image coding modes, for example, for the optimal binary M vector having '4' image coding modes, the total number of pairs can be "$^4C_2=6$".

At 406, a cost function value may be determined for each pair of the plurality of image coding modes, and a pair having least cost function value may be selected. The cost function value may be the difference of the objective function values of the image coding modes in the pair. The processor 106 may be configured to determine a cost function value for each pair of the plurality of image coding modes. The processor 106 may be further configured to select a pair that has least cost function value among all other pairs.

At 408, signaling bits may be assigned in a set of signaling bits corresponding to the image coding modes present in the least cost pair. The binary '0' may be assigned to the image coding mode that has lesser objective function value as compared to other image coding mode in the pair. In other words, binary '1' may be assigned to the image coding mode that has higher objective function value as compared to other image coding mode in the pair. The processor 106 may be configured to allocate a signaling bit either '1' or '0' in a set of signaling bits corresponding to each image coding mode in the least cost pair.

At 410, the image coding modes in the least cost pair may be merged to form a single image coding mode and the objective function value is updated based on the cost function value of the least cost pair. The processor 106 may be configured to merge the image coding modes in the least cost pair to generate a single image coding mode and update the objective function value of the single image coding mode based on the cost function value of the least cost pair.

At 412, it may be determined whether any image coding mode is still available in the binary M vector, which is not merged. In a case where, any image coding mode is still available, then the control returns to 404, or else the control passes to end. The execution of these operations may result in a signaling vector comprising a set of signaling bits for each mode enabled in the optimal binary M vector. The implementation of this method is illustrated in detail in FIG. 4B.

Figure 4B:
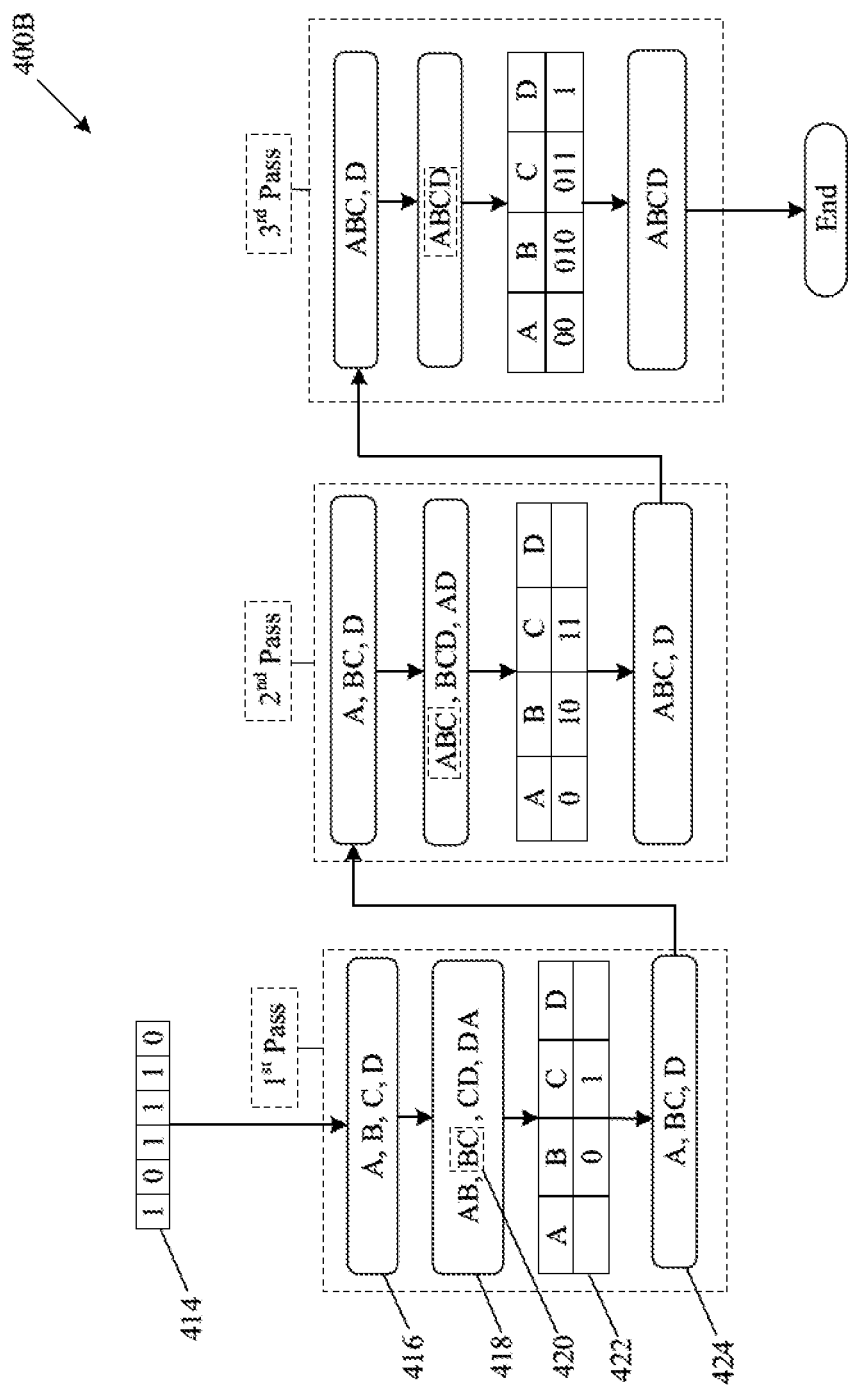
FIG. 4B illustrates an exemplary scenario that illustrates operations to generate the set of signaling bits used by the media device of FIG. 1, in accordance with an embodiment of the disclosure.

FIG. 4B shows an example that illustrates operations to generate the set of signaling bits used by the media device of FIG. 1, in accordance with an embodiment of the disclosure. FIG. 4B is explained in conjunction with elements from FIGS. 1, 2, 3, and 4A. With reference to FIG. 4B, there is shown a process flow 400B implemented in accordance with the flow chart 400A. The process flow 400B includes 3 different passes, i.e. a first pass, a second pass, and a third pass. The process starts with the first pass in which initially a binary M vector 414 is received that represents an optimal combination of image coding modes 416. The bit-position of '1' in the binary m vector may correspond to image coding modes A, B, C, and D. Then, the control passes to 404 in the flow chart 400A.

At 404, pairs of image coding modes 418 may be constructed. As there are 4 modes, the number of pairs may be "$^4C_2=6$", which includes AB, BC, CD, DA, BD, and AC pairs.

At 406, the cost function value may be determined for each of the AB, BC, CD, DA, BD, and AC pairs. Here, "BC" has the minimum cost function value as compared to other pairs and it is selected as a least cost pair 420.

At 408, signaling bits '1' and '0' may be assigned in the set of signaling bits 422 for the least cost pair 420. Here, '1' is assigned to mode C as the objective function value of C is higher than that of B.

At 410, the image coding modes B and C of the least cost pair 420 may be merged together and the objective function value of the combined mode may be updated based on the cost function value of the least cost pair 420. As a result, a new combination of image coding modes 424 is obtained, which includes 3 modes A, BC, and D.

At 412, it may be determined that individual image coding modes A and D are still available in the new combination of modes 424. Each combination of modes may be a defined sequence of modes, where encoding operations are executed one after another in a defined sequence. This may further indicate that signaling bits have not been assigned in the set of signaling vector 422 for modes A and D. Then, the control returns to 404, which may correspond to the second pass of the process flow.

In the second pass, the image coding modes are 3 (A, BC, D). The pairs that can be constructed will be $^3C_2=3$ (ABC, BCD, AD). Here, the least cost pair 420 is determined as ABC and the signaling bits '0' and '1' are assigned to the modes A and BC in the set of signaling bits 422. The BC mode has higher objective function value as compared to A. So, '1' is assigned to B and C after the signaling bits already assigned in the first pass, and '0' is assigned to A. After the signaling bit assignment, the A and BC are merged together and the new combination of image coding modes 424 includes 2 modes ABC and D. As still D is available as an individual mode, the control returns to 404, which may correspond to the third pass.

In the third pass, the image coding modes are 2 (ABC, D). The pairs that can be constructed with these will be $^2C_2=1$ (ABCD). Here, the least cost pair 420 is determined as ABCD and the signaling bits '0' and '1' are assigned to the modes ABC and D in the set of signaling bits 422. The D mode has higher objective function value as compared to ABC. So, '0' is assigned to A, B and C after the signaling bits already assigned in the second pass, and '1' is assigned to D. After the signaling bit assignment, the modes ABC and D are merged together and the new combination of image coding modes 424 includes only single modes ABCD. As no individual mode is available, the control passes to end. The output received is the set of signaling bits 422 that includes signaling bits for each mode in the optimal combination of image coding modes 416. The final set of signaling bits 422 represents A as "00", B as "010", C as "011", and D as "1".

Figure 5:
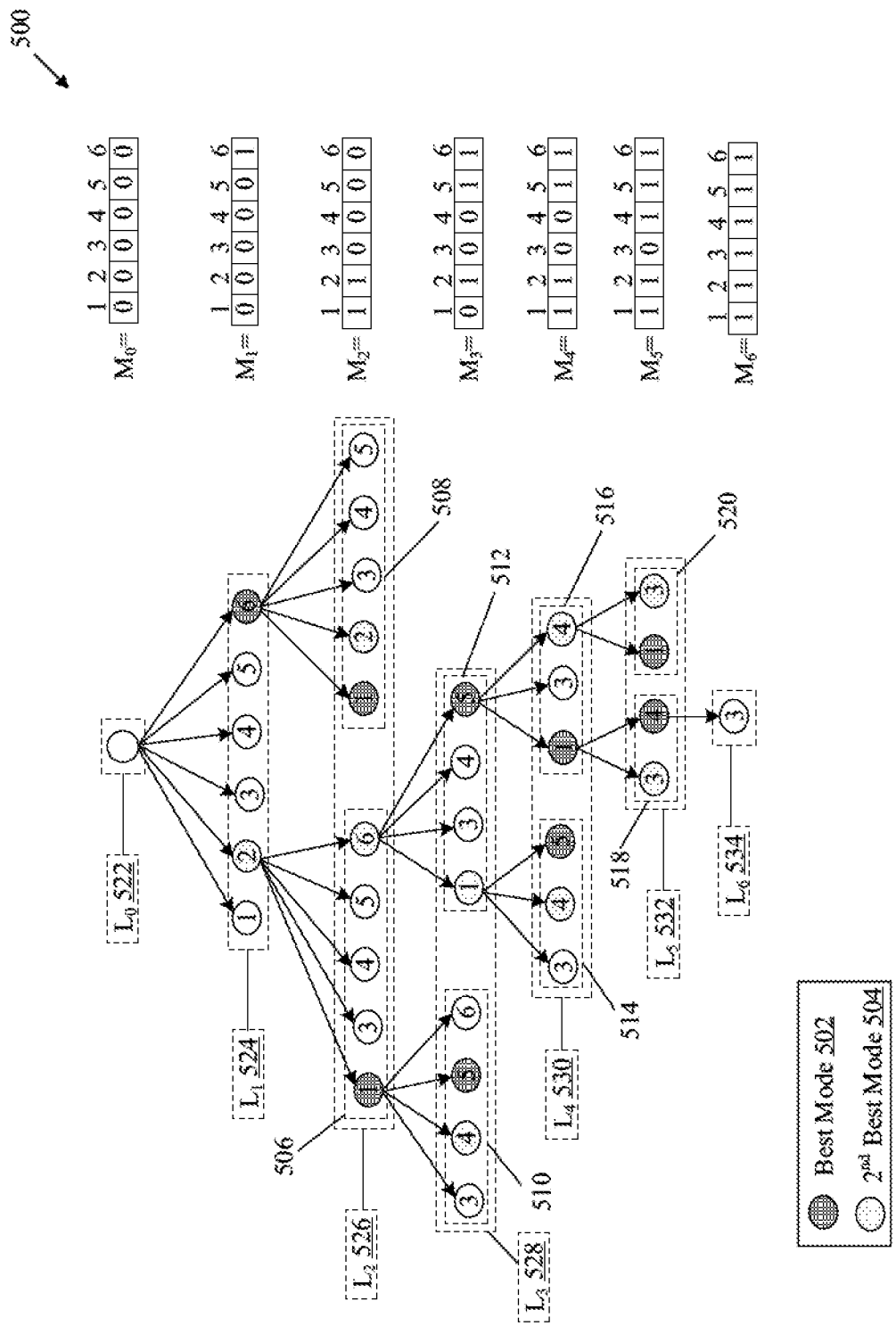
FIG. 5 illustrates generation of a plurality of binary M vectors by the media device of FIG. 1, in accordance with an embodiment of the disclosure.

FIG. 5 illustrates generation of a plurality of binary M vectors by the media device of FIG. 1, in accordance with an embodiment of the disclosure. FIG. 5 is explained in conjunction with elements from FIGS. 1, 2, 3, 4A and 4B. With reference to FIG. 5, there is shown a diagram 500 that shows generation of a plurality of binary M vectors ($M_0$ to $M_6$) and different levels 522 to 534 (also represented by $L_0$ to $L_6$) corresponding to number of enabled image coding modes.

In an example, the processor 106 may have multiple image coding codes (for example, 6 image coding modes). The processor 106 may generate a plurality of optimal combinations of image coding modes. In each optimal combination of image coding modes a different number image coding modes may be enabled. For example, '6' optimal combinations of image coding modes (represented by the plurality of binary M vectors $M_0$ to $M_6$) may be generated, in which number of enabled modes are '1, 2, 3, 4, 5, and 6' respectively. Initially, at 522 (also represented by "$L_0$") no image coding mode may be enabled and the binary vector $M_0$ may include all zero bits. The processor 106 may be configured to calculate the objective function value for each mode of the 6 image coding modes and determine a best mode 502 and a second best mode 504 that have higher objective function value as compared to remaining modes.

At 524 (also represented by "$L_1$"), mode 6 and mode 2 may be determined as the best mode 502 and the second best mode 504 respectively. The signaling bit in the binary vector $M_1$ may be set as '1' at a position corresponding to the best mode 502 (mode 6 here). The processor 106 may be configured to set the best mode 502 as a first mode and further determine a second mode from the remaining modes. Also, the processor 106 may be configured to set the second best mode 504 as a first mode and further determine a second mode from the remaining modes.

At 526 (also represented by "$L_2$"), there are two sets of modes 506 and 508 corresponding to the second best mode 504 and the best mode 502 of "$L_1$", respectively. In set 506, mode 1 and mode 6 may be determined as the best mode 502 and the second best mode 504 respectively, based on the difference of the objective function value between each mode of the set 506 and the mode 2 of "$L_1$". In set 508, mode 1 and mode 2 may be determined as the best mode 502 and the second best mode 504 respectively, based on the difference of the objective function value between each mode of the set 508 and the mode 6 of "L1". Thus, there are two best combinations of modes at same level, which are (mode 2 and mode 1), and (mode 6 and mode 1). The processor 106 may be configured to select any one of these two best combinations (i.e., best sequence of image coding modes), which has the higher difference of objective function value. The combination (mode 2 and mode 1) may be selected as the best combination and consequently, the signaling bits in the binary vector $M_2$ may be set as '1' at positions corresponding to position of mode 2 and mode 1. The second best combination (mode 2 and mode 6) may be also selected from the set 506 (the set from which the best combination is selected).

At 528 (also represented by "$L_3$"), there are two sets of modes 510 and 512 corresponding to the best combination and the second best combination of "$L_2$", respectively. In set 510, mode 5 and mode 4 may be determined as the best mode 502 and the second best mode 504 respectively, based on the difference of the objective function value between each mode of the set 506 and the best combination (mode 2 and mode 1) of "$L_2$". In set 512, mode 5 and mode 1 may be determined as the best mode 502 and the second best mode 504 respectively, based on the difference of the objective function value between each mode of the set 512 and the second best combination (mode 2 and mode 6) of "$L_2$". At this point, there are two best combinations of modes at same level, which are (mode 2, mode 1, and mode 5), and (mode 2, mode 6, and mode 5). The combination (mode 2, mode 6, and mode 5) may be selected as the best combination and consequently, the signaling bits in the binary vector $M_3$ may be set as '1' at positions corresponding to position of mode 2, mode 6, and mode 5. The second best combination (mode 2, mode 6, and mode 1) may be also selected from the set 512 (the set from which the best combination is selected).

At 530 (also represented by "$L_4$"), there are two sets of modes 514 and 516 corresponding to the second best combination and the best combination of "$L_3$", respectively. In set 514, mode 5 and mode 4 may be determined as the best mode 502 and the second best mode 504 respectively, based on the difference of the objective function value between each mode of the set 514 and the best combination (mode 2, mode 6, mode 5) of "$L_3$". In set 516, mode 1 and mode 4 may be determined as the best mode 502 and the second best mode 504 respectively, based on the difference of the objective function value between each mode of the set 516 and the second best combination (mode 2, mode 6, and mode 1) of "$L_3$". The combination (mode 2, mode 6, mode 5, mode 1) may be selected from set 516, as the best combination and consequently, the signaling bits in the binary vector $M_4$ may be set as '1' at positions corresponding to position of mode 2, mode 6, mode 5, and mode 1. The second best combination (mode 2, mode 6, mode 5, and mode 4) may be also selected from the set 516 (the set from which the best combination is selected).

At 532 (also represented by "$L_5$"), there are two sets of modes 518 and 520 corresponding to the best combination and the second best combination of "$L_4$", respectively. In set 518, mode 4 and mode 3 may be determined as the best mode 502 and the second best mode 504 respectively, based on the difference of the objective function value between each mode of the set 518 and the best combination (mode 2, mode 6, mode 5, mode 1) of "$L_4$". In set 520, mode 1 and mode 3 may be determined as the best mode 502 and the second best mode 504 respectively, based on the difference of the objective function value between each mode of the set 520 and the second best combination (mode 2, mode 6, mode 5, mode 4) of "$L_4$". The combination (mode 2, mode 6, mode 5, mode 1, mode 4) may be selected from the set 518, as the best combination and consequently, the signaling bits in the binary vector $M_5$ may be set as '1' at positions corresponding to position of mode 2, mode 6, mode 5, mode 1, and mode 4. At this point, only mode 3 is left and at 534 (also represented by "$L_6$"), the binary vector $M_6$ may be generated in which '1' is assigned at positions corresponding to all the image coding modes at "L6".

Figure 6:
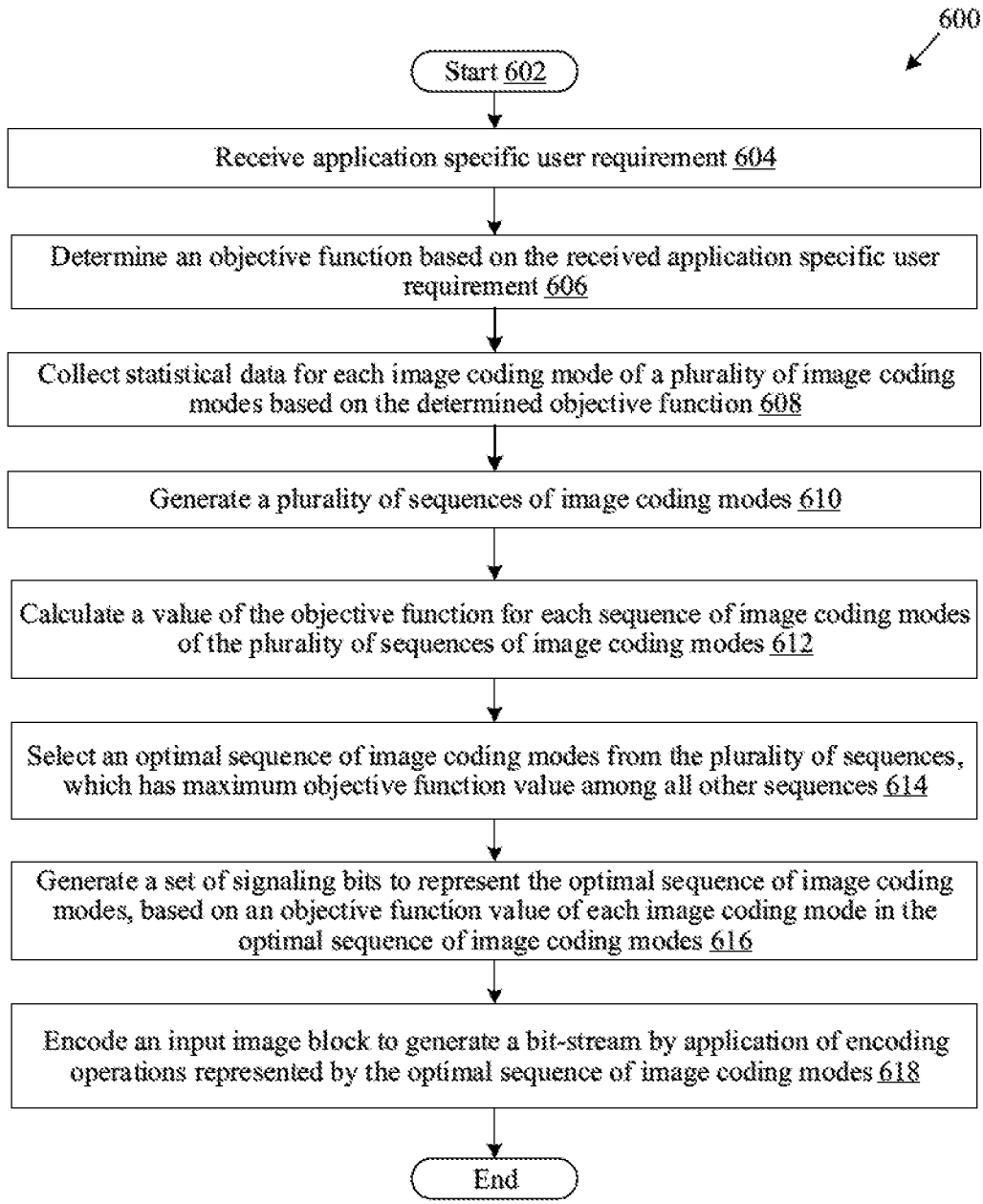
FIG. 6 depicts a flowchart that illustrates an exemplary method for selection of image coding modes for the EBC circuitry, in accordance with an embodiment of the disclosure.

FIG. 6 is a flow chart that illustrates an exemplary method for selection of image coding modes for the EBC circuitry, in accordance with an embodiment of the disclosure. FIG. 6 is explained in conjunction with elements from FIGS. 1, 2, 3, 4A, 4B, and 5. With reference to FIG. 6, there is shown a flowchart 600 implemented in the EBC circuitry 108. The control starts at 602 and passes to 604.

At 604, application specific user requirements may be received. The application specific user requirements may include different compression ratio requirement, random access requirement, input data characteristics, and block size requirement, in accordance with a field of application of encoded data. The processor 106 may be configured to receive the application specific user requirements.

At 606, an objective function may be determined based on the received application specific user requirements. The objective function may be a quality measure of evaluating the coding performance, which varies with the application specific user requirements. The processor 106 may be configured to determine the objective function based on the received application specific user requirements.

At 608, statistical data may be collected for each image coding mode of a plurality of image coding modes based on the determined objective function. The processor 106 may support the plurality of image coding modes to encode an image block. The different type of statistical data may be collected in accordance with the determined objective function. The processor 106 may be configured to collect the statistical data for each image coding mode of the plurality of image coding modes based on the determined objective function.

At 610, a plurality of sequences of image coding modes may be generated. The plurality of sequences of image coding modes may be represented by a plurality of binary vectors in which position of '1' indicates the image coding mode present in the sequence. The processor 106 may be configured to generate the plurality of sequences of image coding modes.

At 612, a value of the objective function may be calculated for each sequence of the plurality of sequences of image coding modes. The value of the objective function may be calculated based on the statistical data of image coding modes present in the sequence. The processor 106 may be configured to calculate a value of the objective function for each sequence of the plurality of sequence of image coding modes.

At 614, an optimal sequence of image coding modes may be selected from the plurality of sequences of image coding modes, which has the maximum objective function value among all other sequences of image coding modes. The processor 106 may be configured to select an optimal sequence of image coding modes from the plurality of sequence of image coding modes, based on the calculated objective function value.

At 616, a set of signaling bits may be generated to represent the optimal sequence of image coding modes, based on an objective function value of each image coding mode in the optimal sequence of image coding modes. The set of signaling bits may be generated using a variable length coding scheme, in which length of code word to represent a mode may be variable based on the objective function value. The processor 106 may be configured to generate the set of signaling bits for the optimal sequence of image coding modes, based on the objective function value of each image coding mode in the optimal sequence of image coding modes.

At 618, an input image block may be encoded to generate a bit-stream by application of encoding operations represented by the optimal sequence of image coding modes. The generated bit-stream may also include the set of signaling bits corresponding to the optimal sequence of image coding modes. The encoder circuitry 206 may be configured to encode the input image block to generate the bit-stream based on the application of the encoding operations on the input image block. And the control passes to end.

Certain embodiments of the disclosure may be found in media device (e.g., the media device 102 (FIG. 1)). Various embodiments of the disclosure may provide the media device that may include at least one processor (e.g., the processor 106 (FIG. 1)) and a memory (e.g., the external memory 110 (FIG. 1)). The memory may be configured to store a plurality of modes, which corresponds to a plurality of encoding operations. The at least one processor may be further configured to calculate a value of an objective function for each sequence of modes of a plurality of sequences of modes, based on at least statistical data of the plurality of modes. Each sequence of modes of the plurality of sequences of modes may comprise a combination of different modes in a defined sequence, from the plurality of modes. The statistical data may include a count of entropy coded bits for each mode of the plurality of modes. The at least one processor may be further configured to select a first sequence of modes from the plurality of sequences of modes based on a first value of the objective function associated with the first sequence of modes. The first value of the objective function may be maximum among a plurality of values of the objective function associated with the plurality of sequences of modes. The selected first sequence of modes may be less than the plurality of modes and may represent an optimal encoding scheme executable to encode an input image block.

In accordance with an embodiment, the memory may be further configured to store the statistical data of the plurality of modes. The at least one processor may be further configured to extract the stored statistical data from the memory based on the objective function and calculate a sum of squared error (SSE) for each sequence of modes of the plurality of sequences of modes based on the extracted statistical data. The at least one processor may be further configured to calculate the value of the objective function for each sequence of modes of the plurality of sequences of modes based on the SSE.

In accordance with an embodiment, the at least one processor may be further configured to determine the objective function based on at least one of a compression ratio requirement, a random access requirement, a block size requirement, or an input image block characteristics. The objective function may be a measure of coding performance. The at least one processor may be further configured to determine the objective function as a sum of an average of peak signal to noise ratio (PSNR) of a plurality of image blocks and a worst PSNR, based on a block level random access requirement and a fixed bit-rate requirement. The worst PSNR may be an average of the PSNR of image blocks that have minimum PSNR among the plurality of image blocks.

In accordance with an embodiment, the plurality of encoding operations may comprise different entropy coding schemes, quantization schemes, residual prediction schemes, and transform coding schemes.

In accordance with an embodiment, the at least one processor may be further configured to generate a set of signaling bits for each mode of the first sequence of modes based on a variable length coding (VLC) scheme. A number of signaling bits in the set of signaling bits for each mode of the first sequence of modes may be variable. In the variable length coding scheme, the at least one processor may be further configured to calculate a value of a cost function for each pair of mode of a plurality of pairs of modes of the first sequence of modes. The value of the cost function may be a difference of values of the objective function of modes in a pair of modes of the plurality of pairs of modes. The at least one processor may be further configured to allocate the number of signaling bits each mode of the first sequence of modes based on the comparison of the value of the cost function. The pair of modes that has a minimum cost function value may be allocated the maximum number of signaling bits.

In accordance with an embodiment, the at least one processor may be further configured to calculate a value of the objective function for each mode of the plurality of modes based on the statistical data of the plurality of modes.

The at least one processor may be further configured to determine a plurality of one-dimensional (1D) vectors (e.g., the plurality of binary M vectors $M_0$ to $M_6$ (FIG. 5)) based on the value of the objective function for each mode of the plurality of modes. The plurality of 1D vectors may correspond to the plurality of sequences of modes, and each 1D vector of the plurality of 1D vectors may indicate a different sequence of modes of the plurality of sequences of modes. A length of each 1D vector of the plurality of 1D vectors may be equal to a count of the plurality of modes. Each 1D vector of the plurality of 1D vectors may comprise binary '1' values, and positions of the binary '1' values in the 1D vector may indicate modes in a corresponding sequence of modes of the plurality of sequences of modes. The at least one processor may be further configured to select a first mode and a second mode from the plurality of modes, based on comparison of the calculated value of the objective function for each mode of the plurality of modes. A value of the objective function for the first mode and a value of the objective function for the second mode may be greater than values of the objective function for remaining modes of the plurality of modes. The at least one processor may be further configured to determine a 1D vector of the plurality of 1D vectors such that a binary '1' value is allocated for one of the first mode or the second mode.

In accordance with an embodiment, the at least one processor may be further configured to generate a set of signaling bits for each mode of the first sequence of modes. The at least one processor may be further configured to communicate the set of signaling bits to an embedded codec (EBC) circuitry (e.g. the EBC circuitry 108 (FIG. 1)). The EBC circuitry may determine the optimal encoding scheme based on the communicated set of signaling bits for each mode of the first sequence of modes. The optimal encoding scheme may comprise a set of encoding operations of the plurality of encoding operations. The EBC circuitry may execute the set of encoding operations to generate a bit-stream of the input image block.

Certain embodiments of the disclosure may be also found in device media device (e.g., the media device 116 (FIG. 1)). Various embodiments of the disclosure may provide the media device that may include a memory (e.g., the external memory 110 (FIG. 1)) and an embedded codec (EBC) circuitry (e.g., the EBC circuitry 108 (FIG. 1)). The EBC circuitry may comprise an encoder circuitry (e.g. the encoder circuitry 206 (FIG. 2)). The memory may be configured to store a plurality of modes, which may correspond to a plurality of encoding operations executed by the encoder circuitry. The encoder circuitry may be further configured to calculate a value of an objective function for each sequence of modes of a plurality of sequences of modes, based on at least statistical data of the plurality of modes. Each sequence of modes of the plurality of sequences of modes may comprise a combination of different modes in a defined sequence, from the plurality of modes. The statistical data may include a count of entropy coded bits for each mode of the plurality of modes. The encoder circuitry may be further configured to select a first sequence of modes from the plurality of sequences of modes based on a first value of the objective function associated with the first sequence of modes. The first value of the objective function may be maximum among a plurality of values of the objective function associated with the plurality of sequences of modes. The encoder circuitry may be further configured to generate a set of signaling bits for each mode of the first sequence of modes. The encoder circuitry may be further configured to encode an input image block by execution of an optimal encoding scheme on the input image block. The set of signaling bits may indicate the optimal encoding scheme.

In accordance with an embodiment, the encoder circuitry may be further configured to determine the optimal encoding scheme based on the set of signaling bits for each mode of the first sequence of modes. The optimal encoding scheme may comprise a set of encoding operations of the plurality of encoding operations, which may correspond to the first sequence of modes. The encoder circuitry may be further configured to generate a bit-stream of an input image block based on application of the optimal encoding scheme on the input image block.

In accordance with an embodiment, the encoder circuitry may be further configured to determine the objective function based on at least one of a compression ratio requirement, a random access requirement, a block size requirement, or an input image block characteristics.

In accordance with an embodiment, the memory may be further configured to store the statistical data of the plurality of modes. The encoder circuitry may be further configured to extract the stored statistical data from the memory based on the objective function and calculate a sum of squared error (SSE) for each sequence of modes of the plurality of sequences of modes based on the extracted statistical data. The encoder circuitry may be further configured to calculate the value of the objective function for each sequence of modes of the plurality of sequences of modes based on the SSE.

In accordance with an embodiment, the encoder circuitry may be further configured to generate a set of signaling bits for each sequence of modes of the plurality of sequence of modes based on a variable length coding (VLC) scheme. A number of signaling bits in the set of signaling bits for each mode of the first sequence of modes may be variable. In the variable length coding scheme, the encoder circuitry may be further configured to calculate a value of a cost function for each pair of mode of a plurality of pairs of modes of the first sequence of modes. The value of the cost function may be a difference of values of the objective function of modes in a pair of modes of the plurality of pairs of modes. The encoder circuitry may be further configured to allocate the number of signaling bits each mode of the first sequence of modes based on the comparison of the value of the cost function. The pair of modes that has a minimum cost function value may be allocated the maximum number of signaling bits.

In accordance with an embodiment, the encoder circuitry may be further configured to calculate a value of the objective function for each mode of the plurality of modes based on the statistical data of the plurality of modes. The encoder circuitry may be further configured to determine a plurality of one-dimensional (1D) vectors (e.g., the plurality of binary M vectors $M_0$ to $M_6$ (FIG. 5)) based on the value of the objective function for each mode of the plurality of modes. The plurality of 1D vectors may correspond to the plurality of sequences of modes, and each 1D vector of the plurality of 1D vectors may indicate a different sequence of modes of the plurality of sequences of modes.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A media device, comprising:
a memory configured to store a plurality of modes, wherein each mode of the plurality of modes corresponds to a different encoding operation of a plurality of encoding operations; and
at least one processor configured to:
calculate a value of an objective function for each sequence of modes of a plurality of sequences of modes, based on at least statistical data of the plurality of modes,
wherein each sequence of modes of the plurality of sequences of modes comprises a combination of different modes in a defined sequence, from the plurality of modes, and
the statistical data comprises a count of entropy coded bits for each mode of the plurality of modes; and
select a first sequence of modes from the plurality of sequences of modes based on a first value of the objective function associated with the first sequence of modes, wherein
the first value of the objective function is maximum among a plurality of values of the objective function associated with the plurality of sequences of modes, and
the selected first sequence of modes is less than the plurality of modes and represents an optimal encoding scheme executable to encode an input image block.

2. The media device according to claim 1, wherein the memory is further configured to store the statistical data of the plurality of modes, and wherein the at least one processor is further configured to:
extract the stored statistical data from the memory based on the objective function;

calculate a sum of squared error (SSE) for each sequence of modes of the plurality of sequences of modes based on the extracted statistical data; and
calculate the value of the objective function for each sequence of modes of the plurality of sequences of modes based on the SSE.

3. The media device according to claim 1, wherein the at least one processor is further configured to:
determine the objective function based on at least one of a compression ratio requirement, a random access requirement, a block size requirement, or an input image block characteristics.

4. The media device according to claim 3, wherein the objective function is a measure of coding performance, and wherein the at least one processor is further configured to:
determine the objective function as a sum of an average of peak signal to noise ratio (PSNR) of a plurality of image blocks and a worst PSNR, based on a block level random access requirement and a fixed bit-rate requirement, wherein the worst PSNR is an average of the PSNR of image blocks that have minimum PSNR among the plurality of image blocks.

5. The media device according to claim 1, wherein the plurality of encoding operations comprises different entropy coding schemes, quantization schemes, residual prediction schemes, and transform coding schemes.

6. The media device according to claim 1, wherein the at least one processor is further configured to generate a set of signaling bits for each mode of the first sequence of modes based on a variable length coding (VLC) scheme, wherein a number of signaling bits for each mode of the first sequence of modes is variable.

7. The media device according to claim 6, wherein in the variable length coding scheme, the at least one processor is further configured to:
calculate a value of a cost function for each pair of mode of a plurality of pairs of modes of the first sequence of modes, wherein the value of the cost function is a difference of values of the objective function of modes in a pair of modes of the plurality of pairs of modes; and
allocate the number of signaling bits for each mode of the first sequence of modes based on the calculated value of the cost function, wherein the pair of modes that has a minimum value of the cost function is allocated the maximum number of signaling bits.

8. The media device according to claim 1, wherein the at least one processor is further configured to:
calculate a second value of the objective function for each mode of the plurality of modes based on the statistical data of the plurality of modes; and
determine a plurality of one-dimensional (1D) vectors based on the second value of the objective function, wherein the plurality of 1D vectors corresponds to the plurality of sequences of modes, and wherein each 1D vector of the plurality of 1D vectors indicates a different sequence of modes of the plurality of sequences of modes.

9. The media device according to claim 8, wherein a length of each 1D vector of the plurality of 1D vectors is equal to a count of the plurality of modes, wherein each 1D vector of the plurality of 1D vectors comprises binary '1' values, and wherein positions of the binary '1' values indicate modes in a corresponding sequence of modes of the plurality of sequences of modes.

10. The media device according to claim 8, wherein the at least one processor is further configured to:

select a first mode and a second mode from the plurality of modes, based on comparison of the calculated second value of the objective function for each mode of the plurality of modes, wherein a third value of the objective function for the first mode and a fourth value of the objective function for the second mode are greater than values of the objective function for remaining modes of the plurality of modes; and determine a 1D vector of the plurality of 1D vectors such that a binary '1' value is allocated for one of the first mode or the second mode.

11. The media device according to claim 1, wherein the at least one processor is further configured to:

generate a set of signaling bits for each mode of the first sequence of modes; and communicate the set of signaling bits to an embedded codec (EBC) circuitry, wherein the EBC circuitry determines the optimal encoding scheme based on the communicated set of signaling bits for each mode of the first sequence of modes, wherein the optimal encoding scheme comprises a set of encoding operations of the plurality of encoding operations.

12. The media device according to claim 11, wherein the EBC circuitry executes the set of encoding operations to generate a bit-stream of the input image block.

13. A media device, comprising:

embedded codec (EBC) circuitry that comprises encoder circuitry;

a memory configured to store a plurality of modes, wherein each mode of the plurality of modes corresponds to a different encoding operation of a plurality of encoding operations executed by the encoder circuitry, wherein the encoder circuitry is configured to:

calculate a value of an objective function for each sequence of modes of a plurality of sequences of modes, based on at least statistical data of the plurality of modes, wherein each sequence of modes of the plurality of sequences of modes comprises a combination of different modes in a defined sequence, from the plurality of modes, and the statistical data comprises a count of entropy coded bits for each mode of the plurality of modes;

select a first sequence of modes from the plurality of sequences of modes based on a first value of the objective function associated with the first sequence of modes, wherein the first value of the objective function is maximum among a plurality of values of the objective function associated with the plurality of sequences of modes;

generate a set of signaling bits for each mode of the first sequence of modes; and encode an input image block by execution of an optimal encoding scheme on the input image block, wherein the set of signaling bits indicates the optimal encoding scheme.

14. The media device according to claim 13, wherein the encoder circuitry is further configured to:

determine the optimal encoding scheme based on the set of signaling bits for each mode of the first sequence of modes, wherein the optimal encoding scheme comprises a set of encoding operations of the plurality of encoding operations, and wherein the set of encoding operations corresponds to the first sequence of modes; and generate a bit-stream of the input image block based on application of the optimal encoding scheme on the input image block.

15. The media device according to claim 13, wherein the encoder circuitry is further configured to:

determine the objective function based on at least one of a compression ratio requirement, a random access requirement, a block size requirement, or an input image block characteristics.

16. The media device according to claim 13, wherein the memory is further configured to store the statistical data of the plurality of sequences of modes, and the encoder circuitry is further configured to:

extract the stored statistical data from the memory based on the objective function;

calculate a sum of squared error (SSE) for each sequence of modes of the plurality of sequences of modes based on the extracted statistical data; and calculate the value of the objective function for each sequence of modes of the plurality of sequences of modes based on the SSE.

17. The media device according to claim 13, wherein the encoder circuitry is further configured to generate the set of signaling bits for each sequence of modes of the plurality of sequences of modes based on a variable length coding (VLC) scheme, wherein a number of signaling bits for each sequence of modes of the plurality of sequences of modes is variable.

18. The media device according to claim 17, wherein in the variable length coding scheme, the encoder circuitry is further configured to:

calculate a value of a cost function for each pair of mode of a plurality of pairs of modes of the first sequence of modes, wherein the value of the cost function is a difference of values of the objective function of modes in a pair of modes of the plurality of pairs of modes; and allocate the number of signaling bits for each mode of the first sequence of modes based on the calculated value of the cost function, wherein the pair of modes that has a minimum value of the cost function is allocated the maximum number of signaling bits.

19. The media device according to claim 13, wherein the encoder circuitry is further configured to:

calculate a second value of the objective function for each mode of the plurality of modes based on the statistical data of the plurality of modes; and determine a plurality of one-dimensional (1D) vectors based on the second value of the objective function, wherein the plurality of 1D vectors corresponds to the plurality of sequences of modes, and wherein each 1D vector of the plurality of 1D vectors indicates a different sequence of modes of the plurality of sequences of modes.

20. A method, comprising:

in a media device that comprises a memory and encoder circuitry:

storing, by the memory, a plurality of modes, wherein each mode of the plurality of modes corresponds to a different encoding operation of a plurality of encoding operations;

calculating, by the encoder circuitry, a value of an objective function for each sequence of modes of a plurality of sequences of modes, based on at least statistical data of the plurality of modes, wherein each sequence of modes of the plurality of sequences of modes comprises a combination of different modes in a defined sequence, from the plurality of modes, and the statistical data comprises a count of entropy coded bits for each mode of the plurality of modes; and selecting, by the encoder circuitry, a first sequence of modes from the plurality of sequences of modes based on a first value of the objective function associated with the first sequence of modes, wherein the first value of the objective function is maximum among a plurality of values of the objective function associated with the plurality of sequences of modes, and the selected first sequence of modes is less than the plurality of modes and represents an optimal encoding scheme executable to encode an input image block.

\* \* \* \* \*